United States Patent [19]

Heidemann

[11] Patent Number: 5,285,306
[45] Date of Patent: Feb. 8, 1994

[54] OPTICAL COMMUNICATION SYSTEM WITH A FIBER OPTIC AMPLIFIER

[75] Inventor: Rolf Heidemann, Tamm, Fed. Rep. of Germany

[73] Assignee: Alcatel N.V., Netherlands

[21] Appl. No.: 791,370

[22] Filed: Nov. 14, 1991

[30] Foreign Application Priority Data

Nov. 15, 1990 [DE] Fed. Rep. of Germany .... P4036327

[51] Int. Cl.$^5$ ............................................. H04B 10/12
[52] U.S. Cl. ................................... 359/160; 359/114; 359/173
[58] Field of Search ................ 359/160, 114, 173, 127

[56] References Cited

U.S. PATENT DOCUMENTS

| | | | |
|---|---|---|---|
| 5,035,481 | 6/1991 | Mollenauer | 359/188 |
| 5,121,241 | 6/1992 | Veith | 359/191 |
| 5,140,656 | 8/1992 | Hasegawa | 359/173 |
| 5,153,762 | 10/1992 | Huber | 359/189 |

FOREIGN PATENT DOCUMENTS

| | | |
|---|---|---|
| 0415438 | 3/1991 | European Pat. Off. . |
| 0440276 | 8/1991 | European Pat. Off. . |
| 0449475 | 10/1991 | European Pat. Off. . |

OTHER PUBLICATIONS

"5 Gbit/s Transmission over 146 Km Using Erbium-Doped Fibre Amplifier", B. Wedding et al, Proceedings of the 15th European Conference on Optical Communication (ECOC 89), Gothenburg, Sweden, Sep. 10–14, 1989, vol. 1, pp. 86–89.
Patent Abstracts of Japan, vol. 10, No. 247 (P-490)(2303) Aug. 26, 1986 & JP-A-61075 326 (NEC) Apr. 17, 1986.

*Primary Examiner*—Leslie Pascal
*Attorney, Agent, or Firm*—Ware, Fressola, Van Der Sluys & Adolphson

[57] ABSTRACT

In an optical communication system with a fiber-optic amplifier which includes a wavelength-selective fiber-optic coupler for coupling pump light into the amplifying length of fiber, an additional optical signal, e.g., a service-channel signal, is transmitted from the location of the fiber-optic amplifier in one direction or the other by being used to modulate the pump light. Since the pump light is not completely absorbed in the amplifying length of fiber, a sufficient portion is transferred from the length of fiber into the optical waveguide of the optical communication system and passes down the optical waveguide to the end point of the communication system. There, it is coupled out and passed to an optical receiver from whose output the transmitted additional signal is recovered by demodulation. To prevent the modulation of the pump light from modulating the amplification brought about by the amplifying length of fiber, the additional signal is modulated onto a carrier wave of sufficiently high frequency, and the resulting signal is used to modulate the pump light.

10 Claims, 2 Drawing Sheets

OPTICAL COMMUNICATION SYSTEM WITH A FIBER OPTIC AMPLIFIER

BACKGROUND OF THE INVENTION

1. Field of the Invention

The present invention relates to a system for transmitting an optical signal through an optical waveguide containing a fiber-optic amplifier which includes an amplifying length of fiber, a pump source, and a wavelength-selective fiber optic coupler for coupling the pump source to the amplifying length of fiber.

2. Description of the Prior Art

Such a transmission system is known from "ECOC '89", Fifteenth European Conference on Optical Communication, Sep. 10–14, 1989, Gothenburg, Sweden, Proceedings, Vol. 1, Regular Papers, TuA 5-7, pages 86 to 89.

In the above-referenced article, two different system configurations are explained. In the first ("copropagating configuration"), the light from the pump source is launched into the $Er^{3+}$-doped length of fiber via a coupler which, as viewed in the direction of transmission of the optical signal to be amplified, is located in front of the amplifying length of fiber. In the second system configuration ("counterpropagating configuration"), the coupler, as viewed in the direction of transmission of the signal to be amplified, is located beyond the length of fiber.

SUMMARY OF THE INVENTION

Sometimes it is desirable or necessary in transmission systems to transmit, in addition to the first optical signal, a second optical signal, e.g., a service-channel signal, from the location of the fiber-optic amplifier in one direction or the other.

It is the object of the invention to provide a system suitable for the above purpose.

This object is attained in a system for transmitting a first optical signal through an optical waveguide containing a fiber-optic amplifier which includes an amplifying length of fiber, a pump source, and a wavelength-selective fiber-optic coupler for coupling the pump source to the amplifying length of fiber. In order to transmit an additional information signal through the optical waveguide, a modulator is provided at the pump source which modulates the pump light generated by the pump source with a modulating signal containing the additional information signal. At a point remote from the location of the pump source, the optical waveguide contains a second wavelength-selective fiber-optic coupler which couples pump light received from the pump source through the optical waveguide. An optical receiver is connected to the second wavelength-selective fiber-optic coupler for receiving the information signal contained in the pump light.

In one embodiment, the fiber-optic coupler, as viewed in the direction of transmission of the first optical signal, is located beyond the amplifying length of fiber, so that the additional information signal is transmitted through the optical waveguide in a direction opposite to that of the first optical signal.

In another embodiment, the fiber-optic coupler, as viewed in the direction of transmission of the first optical signal, is located before the amplifying length of fiber, so that the additional information signal is transmitted through the optical waveguide in the same direction as the first optical signal.

In both embodiments, the modulator modulates the additional information signal onto a carrier wave whose frequency $f_0$ is substantially higher than the reciprocal of the lifetime of those energy states of the light-amplifying material of the length of fiber which are excitable in the length of fiber by the pump light.

BRIEF DESCRIPTION OF THE DRAWINGS

The invention will now be explained by way of example with reference to the accompanying drawings, in which.

DETAILED DESCRIPTION OF THE PREFERRED EMBODIMENT

Figure 1:
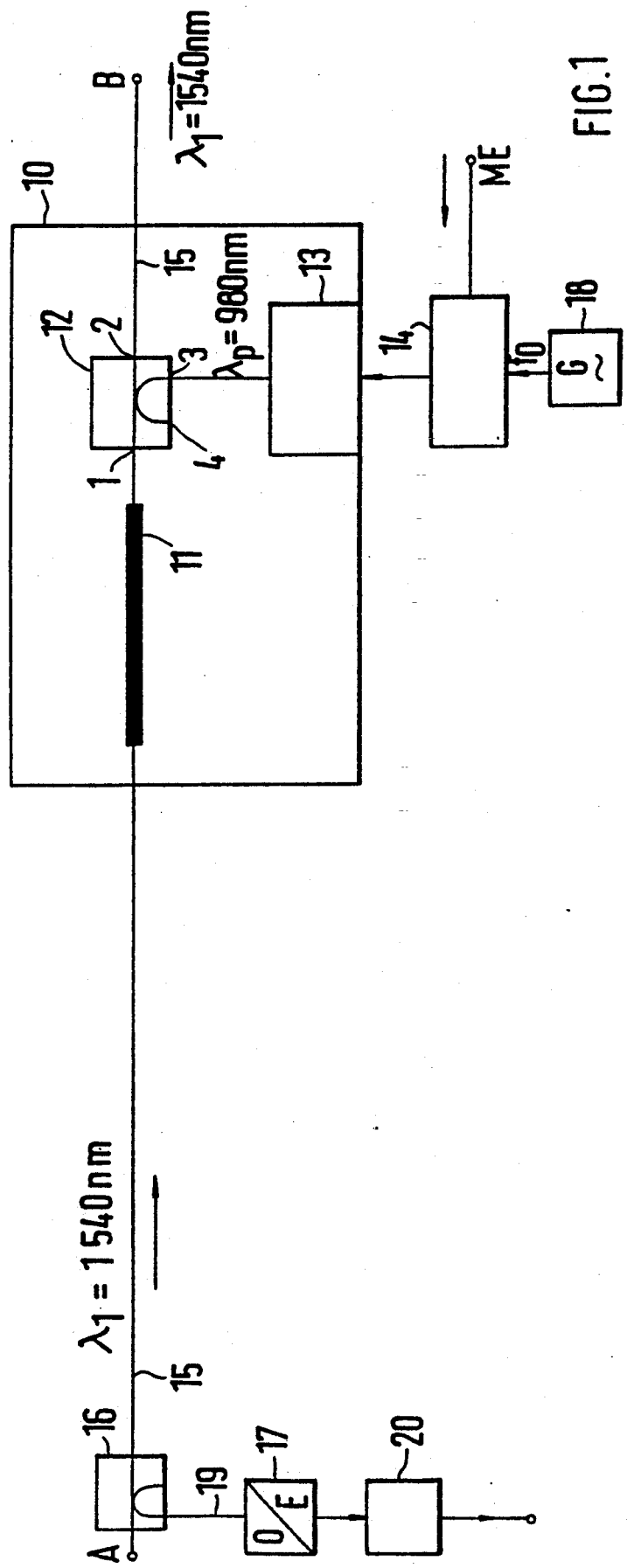
FIG. 1 shows a schematic illustration of an embodiment for transmitting the second optical signal in a direction opposite to that of the first optical signal.

FIG. 1 shows a transmission system for transmitting an optical signal from a point A to a point B. At the end point A, there is an optical transmitter (not shown), and at the end point (B) there is an optical receiver (not shown). The optical signal to be transmitted from A to B has a wavelength $\lambda_1$ of 1540 nm. The transmission link is implemented with a single-mode optical waveguide 15 which has sufficiently good transmission properties at the wavelength $\lambda_1$.

The system of FIG. 1, like the prior art system referred to above, includes a fiber-optic amplifier 10 consisting of an $Er^{3+}$-doped length of fiber 11, a wavelength-selective fiber-optic coupler 12, and a pump source 13. The coupler 12 has four ports 1 to 4. Port 1 is connected to the $Er^{3+}$-doped length of fiber 11, port 2 is connected via the optical waveguide 15 to the end point B of the optical transmission link, and port 3 is connected via an optical waveguide to the pump source 13. The coupler 12 is a wavelength-selective coupler which has the property of coupling the optical signal of wavelength $\lambda_1$, which is to be transmitted from A to B, from port 1 to port 2 with minimum loss, and of coupling the pump light generated by the pump source 13, which has a wavelength $\lambda_p$ of 980 nm, from port 3 to port 1 with minimum loss. Port 4 is unused.

To be able to transmit an additional information signal, e.g., a service-channel signal or signals for monitoring the fiber-optic amplifier itself, from the location of the pump source to the end point A of the optical transmission link, according to the invention, a modulator 14 is provided at the pump source 13. This modulator modulates the pump light generated by the pump source 13 with a modulating signal containing the additional information signal. It is preferably a frequency modulator which modulates an analog or digital additional signal applied at its modulation input ME, e.g., a signal at baseband, onto a carrier wave of frequency $f_0$ from a generator 18. The output of the frequency modulator 14 thus provides the modulating signal for the pump source, i.e., the carrier wave frequency-modulated with the additional signal. As will be recognized by those skilled in the art, the pump source 13 must contain the necessary control circuits for its laser, i.e., the laser driver, and a control circuit for the DC bias to be applied to the laser. The modulating signal is injected into the laser driver of the pump source 13, thereby modulating the intensity of the light generated by the pump source 13.

In another embodiment, the pump source generates unmodulated light, and the modulating signal is used to modulate the pump light in a modulator following the pump source. Whereby the pump light generated by the pump source is modulated.

During normal operation, the intensity of the pump light is so high that a considerable portion which is not absorbed in the length of fiber 11 is transferred from the end of the length of fiber 11 remote from the coupler 12 into the optical waveguide 15 and passes down the latter in the direction of the end point A. In this manner, the additional signal can be transmitted in the direction of the end point A up to the point where the pump light can be detected with a level sufficient for signal transmission. At that point, the optical waveguide 15 contains a fiberoptic wavelength-selective coupler 16 which extracts the pump light from the optical waveguide 15. The output port of the coupler 16 is connected via an optical waveguide 19 to an optical receiver 17 whose output provides the electric modulating signal impressed on the pump light. This modulating signal is finally demodulated in an FM demodulator 20, so that the additional signal appears at the output of the demodulator.

Thus, according to the invention, the portion of the pump light which unavoidably emerges from the length of fiber 11 and could only be suppressed with filters is utilized to transmit an additional signal from the location of the pump source over the length of fiber 11 to the distant end point of the optical transmission link.

To prevent the modulation of the pump light from modulating the amplification brought about by passing the optical signal to be transmitted from end point A to end point B through the amplifying length of fiber 11, a suitable value is chosen for the frequency $f_0$ of the carrier used in the FM modulator 14. A suitable frequency $f_0$ has a value which is substantially greater than the reciprocal of the lifetime of those energy states of the $Er^{3+}$-doped material of the length of fiber 11 which are excitable by the pump light, i.e., a value above 1 MHz.

One application of the novel communication system shown in FIG. 1 is in a cable television distribution system in which an electric frequency-division multiplex signal with a bandwidth of 450 MHz has to be transmitted over the optical transmission link, and in which front-end equipment, which distributes the optical signal to a plurality of optical waveguides running to individual subscribers, contains the fiber-optic amplifier 10, which then serves to amplify the optical signal before it is distributed to the optical waveguides. In such a system, as shown in FIG. 1, a reverse channel can be installed from the location of the pump source to the end point A, i.e., the head end, for transmitting an additional signal, e.g., a service-channel signal.

The system described has the so-called counterpropagating configuration, in which the coupler coupling the pump light into the doped length of fiber, as viewed in the direction of transmission of the optical signal to be amplified, is located beyond the amplifying length of fiber 11. With the aid of FIG. 2, a system configuration, the so-called copropagating configuration, will now be explained in which the coupler coupling the pump light into the doped length of fiber, as viewed in the direction of transmission of the optical signal to be amplified, is located before the amplifying length of fiber. In such a configuration, too, the pump light which is not absorbed in and emerges from the doped length of fiber can be used to transmit an additional signal.

Figure 2:
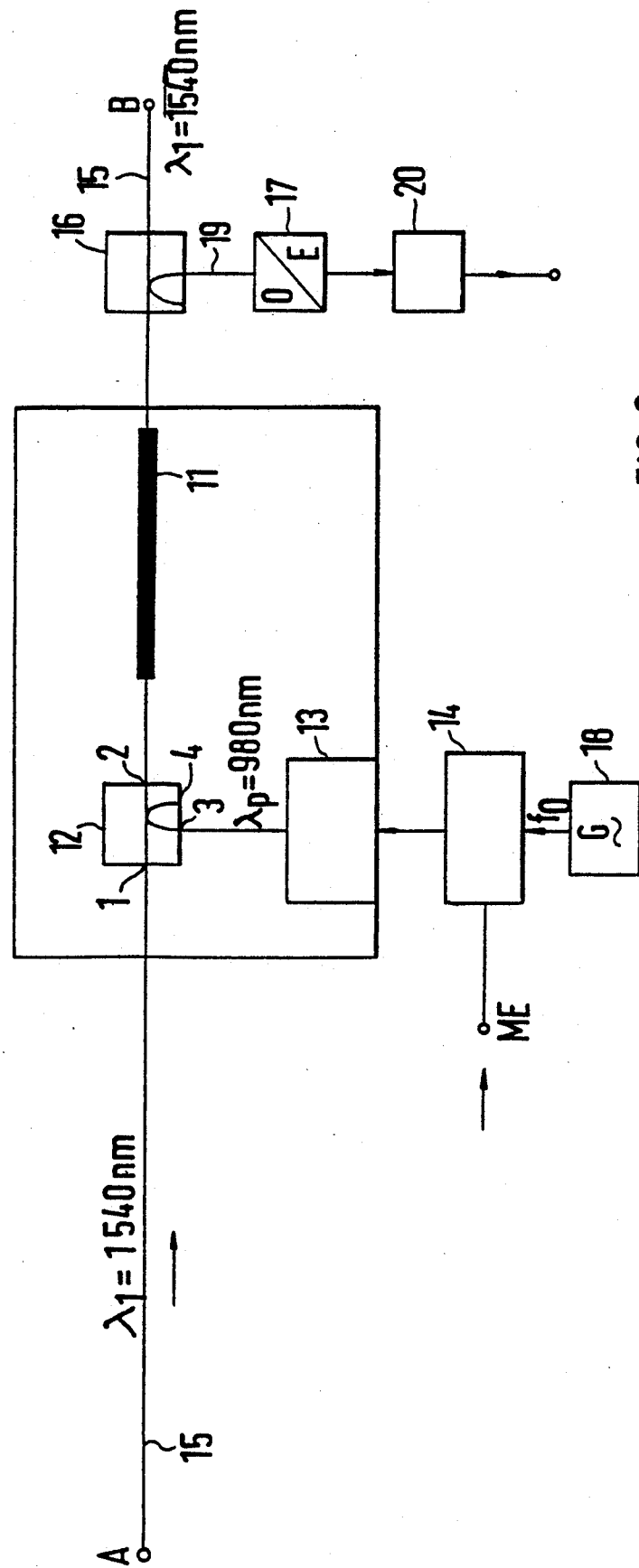
FIG. 2 shows a schematic illustration of an embodiment for transmitting the second optical signal in the same direction as the first optical signal.

In the system according to the invention shown in FIG. 2, parts having the same functions as in FIG. 1 are designated by similar reference characters and hence need not be explained again. The coupler 12, as viewed in the direction of transmission of the signal to be transmitted from A to B, is located before the $Er^{3+}$-doped length of fiber 11. As in FIG. 1, it couples the signal from port 1 to port 2 and the pump light from port 3 to the length of fiber 11, the latter via port 2 instead of port 1 as in FIG. 1. In this configuration of FIG. 2, the pump light emerging from the doped length of the fiber 11 travels in the direction of the end point B of the transmission system, i.e., in the same direction as the first optical signal of wavelength $\lambda_1$; in the system of FIG. 1, it travels in the opposite direction.

Thus, the embodiment of the invention shown in FIG. 1 can be used if an additional signal has to be transmitted from the location of the pump source of the transmission link in the direction of the source of the first optical signal, i.e., the end point A, and the system of FIG. 2 can be used if an additional signal has to be transmitted from the location of the pump source of the fiber-optic amplifier in the direction of the sink of the first optical signal, i.e., to the end point B.

By combining the two embodiments, a fiber-optic amplifier is obtained whose doped length of fiber is fed from a pump source at each of its two ends, so that two additional signals can be transmitted from the location of the fiber-optic amplifier in different directions of the transmission system.

The wavelengths mentioned in the foregoing description are only examples of wavelengths for which the available system components are suitable. It is, of course, possible to use other wavelengths, with the signal wavelength $\lambda_1$ lying in the range between 1520 and 1570 nm, and the pump wavelength being 532 nm, 800 nm, 980 nm or 1480 nm.

Thus it can be seen from the foregoing specification and attached drawings that the optical signal transmitting system of the present invention provides an effective means for providing a second optical signal, such as a service channel signal, from the location of the fiber-optic amplifier in one direction or the other.

The preferred embodiments admirably achieve the objects of the present invention; however, it should be appreciated that departures can be made by those skilled in the art without departing from the spirit and scope of the invention which is limited only by the following claims.

What is claimed is:

1. System for transmitting a first optical signal through two parts of an optical waveguide interconnected by a fiber-optic amplifier which includes an amplifying length of fiber connected at a first end to a selected one of the two parts of the optical waveguide, a wavelength-selective fiber-optic coupler interconnected between a second end of the amplifying length of fiber and the other one of the two parts of the optical waveguide, and a pump source for providing a pump light signal to the coupler, wherein the coupler is for coupling the pump light signal to the amplifying length of fiber, wherein in order to provide an additional information signal through the selected one of the two parts of the optical waveguide, a modulator is connected to the pump source for providing a modulating signal containing the additional information signal for modulating the pump light signal, at a point remote from the first end of the amplifying length of fiber of the fiber-optic amplifier, the selected one of the two parts of the optical waveguide has a second wavelength-selective fiber-optic coupler interconnected therein which couples the pump light signal received from the fiber-optic amplifier through the optical waveguide, and an optical receiver connected to the second wavelength-selective fiber-optic coupler and responsive to the pump light signal for receiving the additional information signal contained in the pump light signal.

2. A system as claimed in claim 1, wherein the second wavelength-selective fiber-optic coupler is responsive to the additional information signal from the fiber-optic amplifier and transmitted through the selected one of the two parts of the optical waveguide in a direction opposite to that of the first optical signal.

3. A system as claimed in claim 2, characterized in that the modulator modulates the additional information signal onto a carrier wave whose frequency is substantially higher than a reciprocal of a lifetime of those energy states of a light-amplifying material of the amplifying length of fiber which are excitable in the amplifying length of fiber by the pump light signal.

4. A system as claimed in claim 3, characterized in that the modulator modulates the additional information signal onto a carrier wave whose frequency is substantially higher than a reciprocal of a lifetime of those energy states of a light-amplifying material of the amplifying length of fiber which are excitable in the amplifying length of fiber by the pump light signal.

5. A system as claimed in claim 1, wherein the second wavelength-selective fiber-optic coupler is responsive to the additional information signal from the fiber-optic amplifier and transmitted through the selected one of the two parts of the optical waveguide in the same direction as the first optical signal.

6. A system as claimed in claim 1, characterized in that the modulator modulates the additional information signal onto a carrier wave whose frequency is substantially higher than a reciprocal of a lifetime of those energy states of a light-amplifying material of the amplifying length of fiber which are excitable in the amplifying length of fiber by the pump light signal.

7. An optical fiber communication system comprising a pumped coupler-amplifier, responsive to a transmitted optical signal from a transmitting node, for providing an amplified optical signal to a receiving node, wherein the system further comprises:

a modulator, responsive to an electrical information signal and an electrical carrier signal, for providing a modulated electrical carrier signal, and wherein the pumped coupler-amplifier is responsive to the modulated electrical carrier signal for providing a coupled, modulated, pumped light signal for detection;

a detection decoupler, responsive to the coupled, modulated pumped light signal from the coupler-amplifier, for providing a decoupled light signal;

an optical-to-electrical converter, responsive to the decoupled light signal from the decoupler, for providing a modulated electrical signal; and a demodulator, responsive to the modulated electrical signal, for providing a recovered information signal.

8. The system of claim 7, wherein the decoupler is connected between the transmitting node and the pumped coupler-amplifier.

9. The system of claim 7, wherein the decoupler is connected between the pumped coupler amplifier and the receiving node.

10. The system of claim 7, wherein the pumped coupler-amplifier comprises:

an optical pump, responsive to the modulated carrier signal, for providing a modulated pumped light signal;

a coupler, responsive to the modulated, pumped light signal, for providing a coupled, modulated, pumped light source; and an amplifying length of fiber having light-amplifying material therein, the material having energy states with a known lifetime, the amplifying length of fiber responsive to the coupled, modulated, pumped light signal, wherein the carrier signal has a frequency substantially higher than the reciprocal of the lifetime of the energy states of the light amplifying material, for providing the coupled, modulated pumped light signal to the detection decoupler.

* * * * *